(12) United States Patent
Ho et al.

(10) Patent No.: US 10,231,576 B1
(45) Date of Patent: Mar. 19, 2019

(54) GRILL HAVING A RETRACTABLE WALL

(71) Applicant: Zippy Holdings, LLC, Austin, TX (US)

(72) Inventors: Jonathan K. Ho, Austin, TX (US); Eric Tsang, Anaheim, CA (US)

(*) Notice: Subject to any disclaimer, the term of this patent is extended or adjusted under 35 U.S.C. 154(b) by 21 days.

(21) Appl. No.: 15/695,775

(22) Filed: Sep. 5, 2017

Related U.S. Application Data (63) Continuation-in-part of application No. 15/194,057, filed on Jun. 27, 2016, now abandoned.

(60) Provisional application No. 62/292,977, filed on Feb. 9, 2016.

(51) Int. Cl.
*A47J 37/00* (2006.01)
*A47J 37/07* (2006.01)

(52) U.S. Cl.
CPC .... *A47J 37/0763* (2013.01); *A47J 2037/0777* (2013.01)

(58) Field of Classification Search
CPC .............................................. A47J 2037/0777
USPC ......................................... 126/25 R, 29, 9 R
See application file for complete search history.

(56) References Cited

U.S. PATENT DOCUMENTS

| | | | |
|---|---|---|---|
| 2005/0121018 A1* | 6/2005 | Rosen | A47J 37/0704 126/9 R |
| 2009/0314285 A1* | 12/2009 | Marsh | A47J 37/0763 126/9 R |
| 2013/0055906 A1* | 3/2013 | Kanbur | A47J 37/0623 99/419 |

* cited by examiner

*Primary Examiner* — Vivek K Shirsat
(74) *Attorney, Agent, or Firm* — Sanchelima & Associates, P.A.; Christian Sanchelima; Jesus Sanchelima (57) ABSTRACT

A charcoal grill with a housing capable of a chimney configuration to quickly light heating elements and a grilling configuration in which one of its walls can be retracted downwards and a rock grate placed on its inner surface to extend the possible cooking surface a cooking grid can be placed over.

18 Claims, 10 Drawing Sheets

GRILL HAVING A RETRACTABLE WALL

OTHER RELATED APPLICATIONS

The present application is a continuation-in-part of allowed and pending of U.S. patent application Ser. No. 15/194,057, filed on Jun. 27, 2016, which is hereby incorporated by reference. The present application also claims priority to provisional patent application No. 62/292,977, filed Feb. 9, 2016, which is also hereby incorporated by reference.

BACKGROUND OF THE INVENTION

Field of the Invention

The present disclosure relates to a charcoal grill apparatus, and more specifically to a fast-starting and portable charcoal grill apparatus.

Background of the Invention

Urban dwellers who wish to grill using charcoal often do not have the space to store and operate a full size charcoal grill. Smaller grills, while more portable, require additional accessories such as a chimney starter or ignition fluid to help with igniting the charcoal. Ignition fluid can negatively affect the taste of the food. Chimney starters, while chemical-free, can be almost as large as a compact grill itself rendering it inconvenient for a solo operator to transport both the grill and the chimney starter to and from the grilling site.

BRIEF SUMMARY OF THE INVENTION

The disclosed charcoal grill apparatus may function both as a portable chimney starter and a grill. The apparatus may, in embodiments, combine the elements of a chimney starter and a grill in a compact form that is easy to handle pre and post grilling. In its "chimney configuration", the operator may fill the device with charcoal and ignite kindling material in a portion of the device underneath the charcoal. This allows for the "chimney effect" that may produce a rapid ignition of the charcoal. After the charcoal is lit, the operator may configure the device into a "grill configuration" and may operate it as a grill. This may be accomplished by releasing and pulling down the hinged front sidewall until it is level with the charcoal grate, revealing additional surface area to spread the charcoal.

A food-grilling grate may then be affixed several inches above the charcoal surface. This two-in-one utility may eliminate the need for charcoal lighting accessories or chemicals beyond basic paper for kindling.

BRIEF DESCRIPTION OF THE DRAWINGS

The novel features believed characteristic of the disclosed subject matter will be set forth in any claims that are filed. The disclosed subject matter itself, however, as well as further objectives, and advantages thereof, will best be understood by reference to the following detailed descriptions of illustrative embodiments when read in conjunction with the accompanying FIGURES, wherein:

DETAILED DESCRIPTION OF ILLUSTRATIVE EMBODIMENTS

Reference now should be made to the FIGURES, in which the same reference numbers are used throughout the different FIGURES to designate the same components.

It will be understood that, although the terms first, second, third, etc. may be used herein to describe various elements, these elements should not be limited by these terms. These terms are only used to distinguish one element from another element. Thus, a first element discussed below could be termed a second element without departing from the teachings of the present disclosure.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising" or "includes" and/or "including," when used in this specification specify the presence of stated features, regions, integers, steps, operations, elements, and/or components, but do not preclude the presence or addition of one or more other features, regions, integers, steps, operations, elements, components and/or groups thereof.

It will be appreciated that for simplicity and clarity of illustration, where considered appropriate, reference numerals may be repeated among the figures to indicate corresponding or analogous elements. In addition, numerous specific details are set forth in order to provide a thorough understanding of the implementations described herein. However, it will be understood by those of ordinary skill in the art that the implementations described herein may be practiced without these specific details. In other instances, well-known methods, procedures and components have not been described in detail so as not to obscure the implementations described herein. Also, the description is not to be considered as limiting the scope of the implementations described herein.

In the following detailed description, reference is made to the accompanying FIGURES that form a part hereof, and in which is shown, by way of illustration, specific implementations which may be practiced. These implementations are described in sufficient detail to enable those skilled in the art to practice the implementations, and it is to be understood that other implementations may be utilized and that logical, mechanical, electrical, and other changes may be made without departing from the scope of the implementations. The following detailed description is, therefore, not to be taken in a limiting sense.

Figure 5:
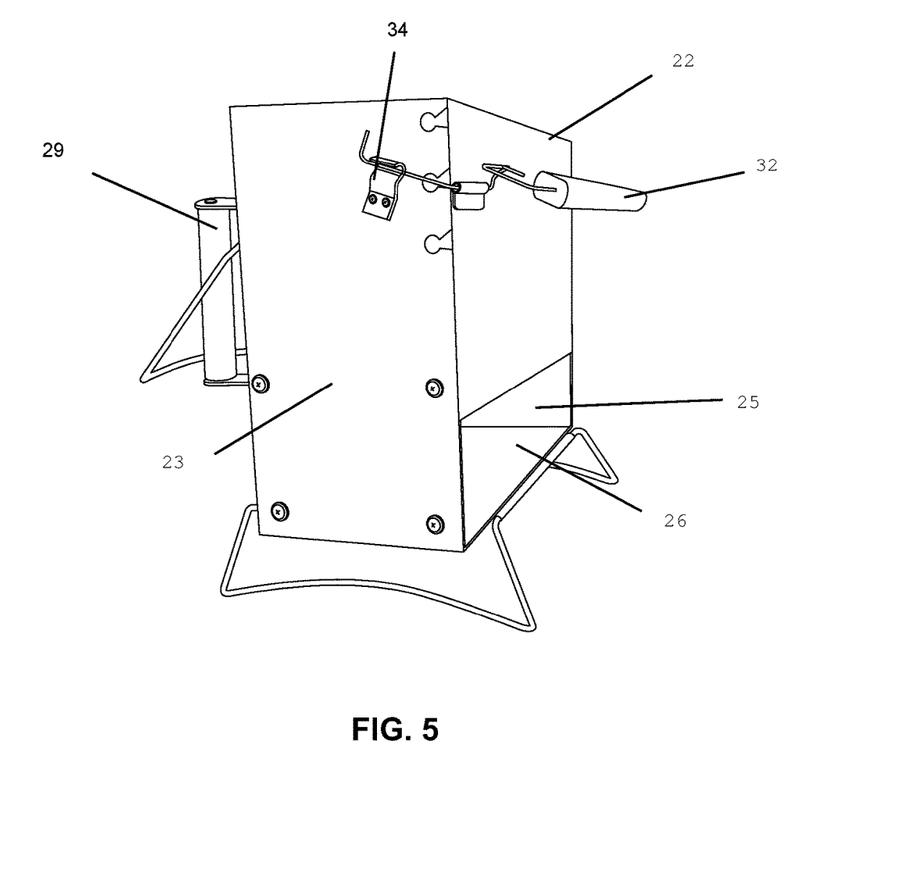
FIG. 5 displays a side isometric view of a charcoal grill apparatus in the chimney configuration showing opening 25 in accordance with embodiments.

The present invention, grill 10, comprises a housing 20, locking assembly 30, cooking grid mounting assembly 40, and a rock grate assembly 80. Housing 20 includes front retractable wall 22, upright sidewalls 23 that can include a right, left, and/or rear sidewall and floor 26. As shown in FIG. 5, there is an opening 25 between the bottom end of front retractable wall 22 and floor 26. Flammable materials (not depicted), such as but not limited to, kindling paper, may be placed through opening 25 and rest on floor 26. In this embodiment, an opening of the lower chamber may be open and may not include a door mechanism. In alternate embodiments, opening 25 can be located on at least one of upright sidewalls 23 and in this alternate embodiment, front retractable wall 22 can include no openings similar to opening 25. In other embodiments, the opening 25 may be covered by a hinged door.

Figure 1:
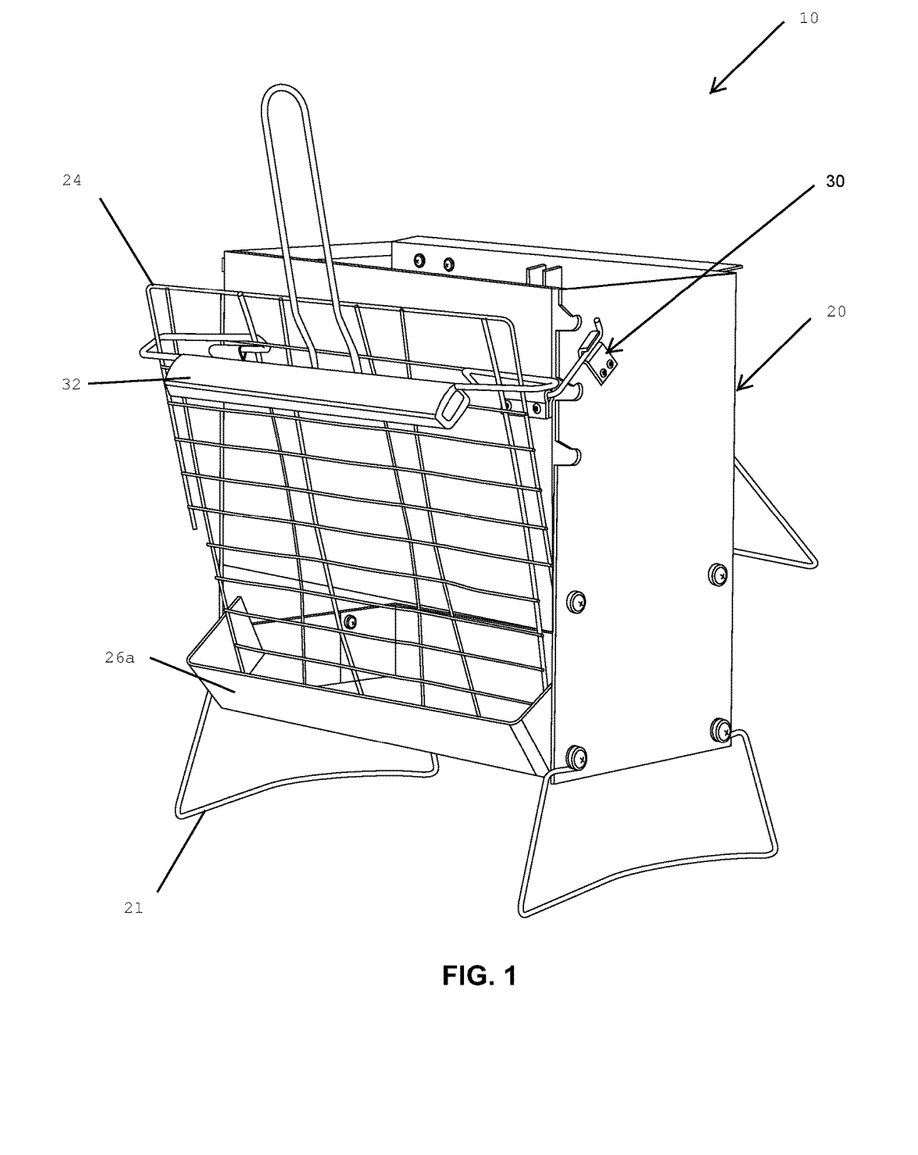
FIG. 1 displays a front isometric view of a charcoal grill in a "chimney configuration" in accordance with embodiments.
Figure 2:
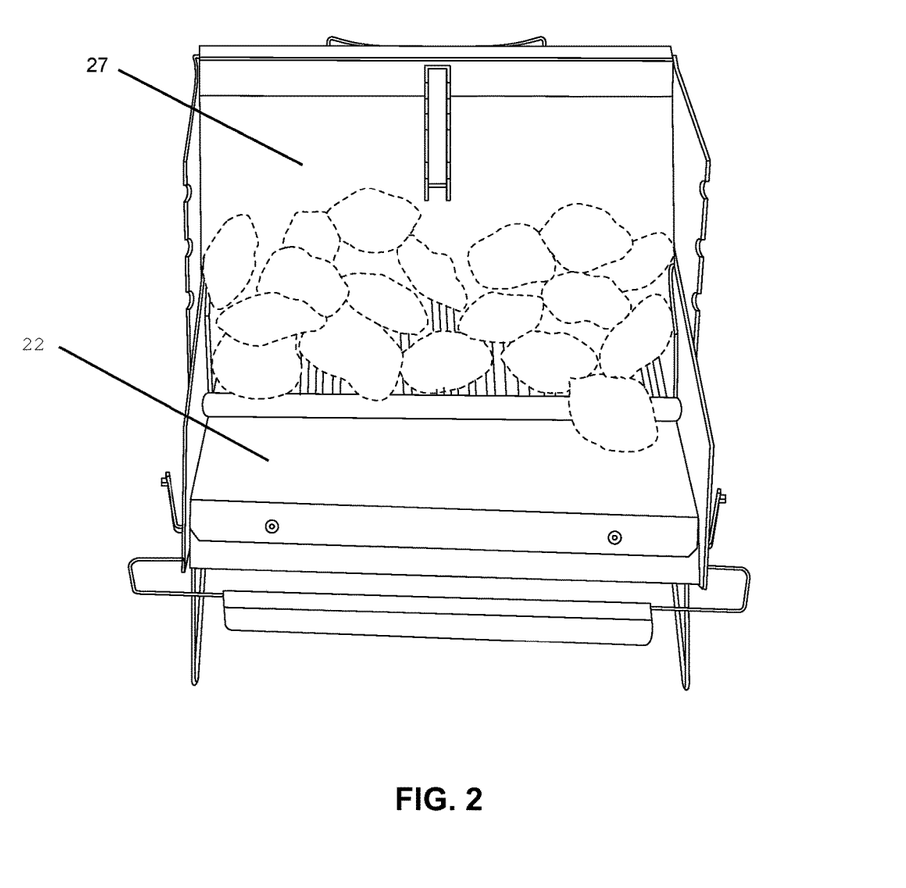
FIG. 2 displays a top isometric view of a charcoal grill with front retractable wall 22 lowered accordance with embodiments.
Figure 3:
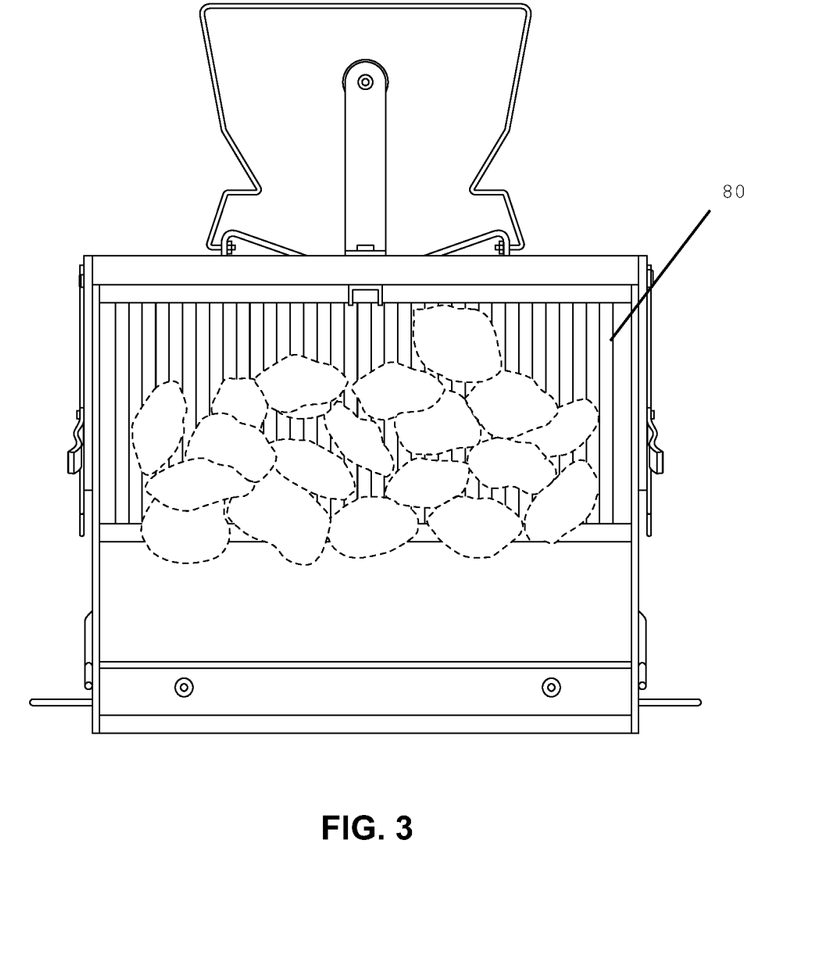
FIG. 3 displays a top view of a charcoal grill in accordance with embodiments.
Figure 6:
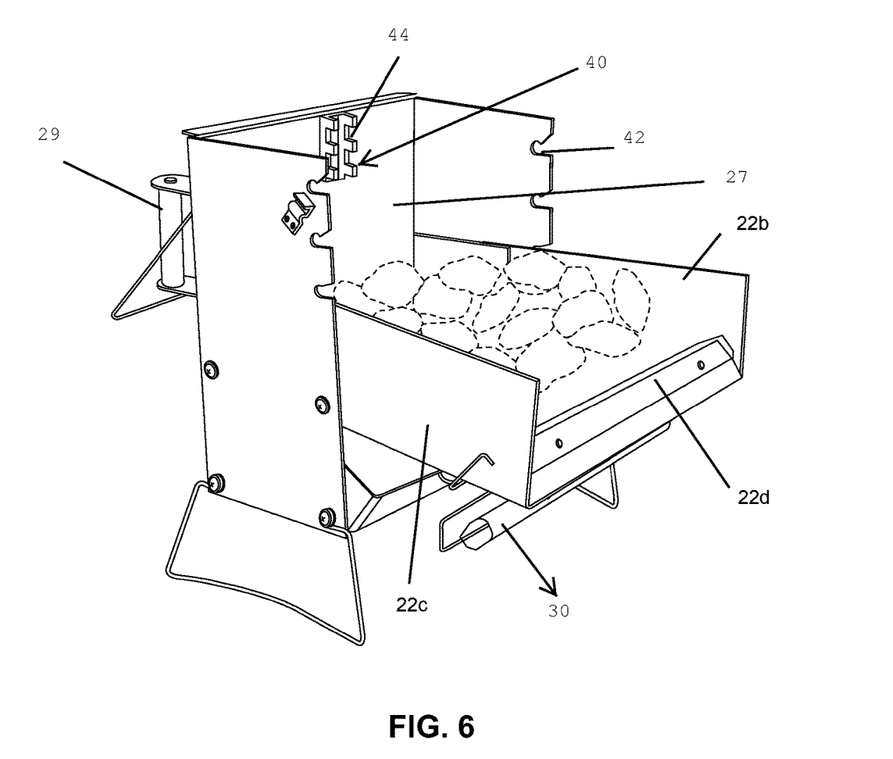
FIG. 6 displays an isometric view of a charcoal grill in an operating or "grill configuration" in accordance with embodiments.

When lit, the flammable materials may provide fire and heat to charcoal—using a chimney effect—located in an upper chamber 27, as shown in FIGS. 2 and 6. As seen in FIG. 1, the present invention may also include legs 21 that support housing 20. In FIG. 3, the charcoal can be seen in supported by rock grate assembly 80.

As shown in FIGS. 5 and 6, housing 20 can also include handle 29 affixed to at least one of upright sidewalls 23 to add convenience for a user transporting the grill. As seen in FIG. 1, cooking grid 24 may be secured for transportation between floor 26 and lip 26a.

As seen in FIG. 5, locking assembly 30 includes a pivoting locking handle 32 can then be used to lock cooking grid 24 in place. In one embodiment, locking handle 32 can be mounted to at least one upright sidewall 23 using anchoring members 34. When the cooking grid 24 is not being used it may be stored in this way. Locking handle 32 also cooperates with anchoring members 34 to lock front retractable wall 22 when the grill is being transported or in its chimney configuration, as seen in FIG. 5.

Figure 4:
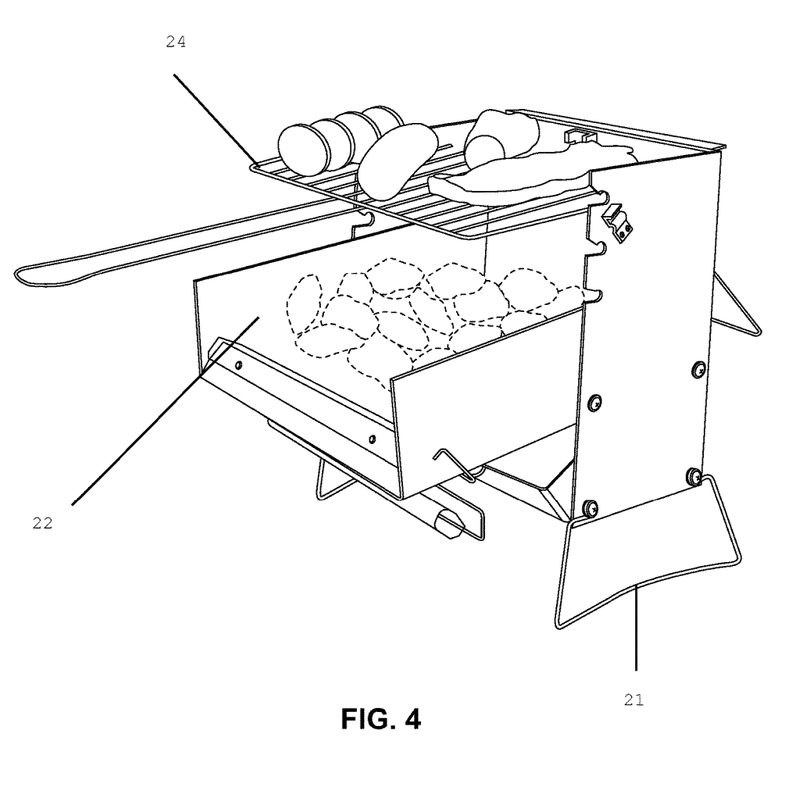
FIG. 4 displays a side isometric view of a charcoal grill in accordance with embodiments showing cooking grid 24 positioned over the heating element.
Figure 10:
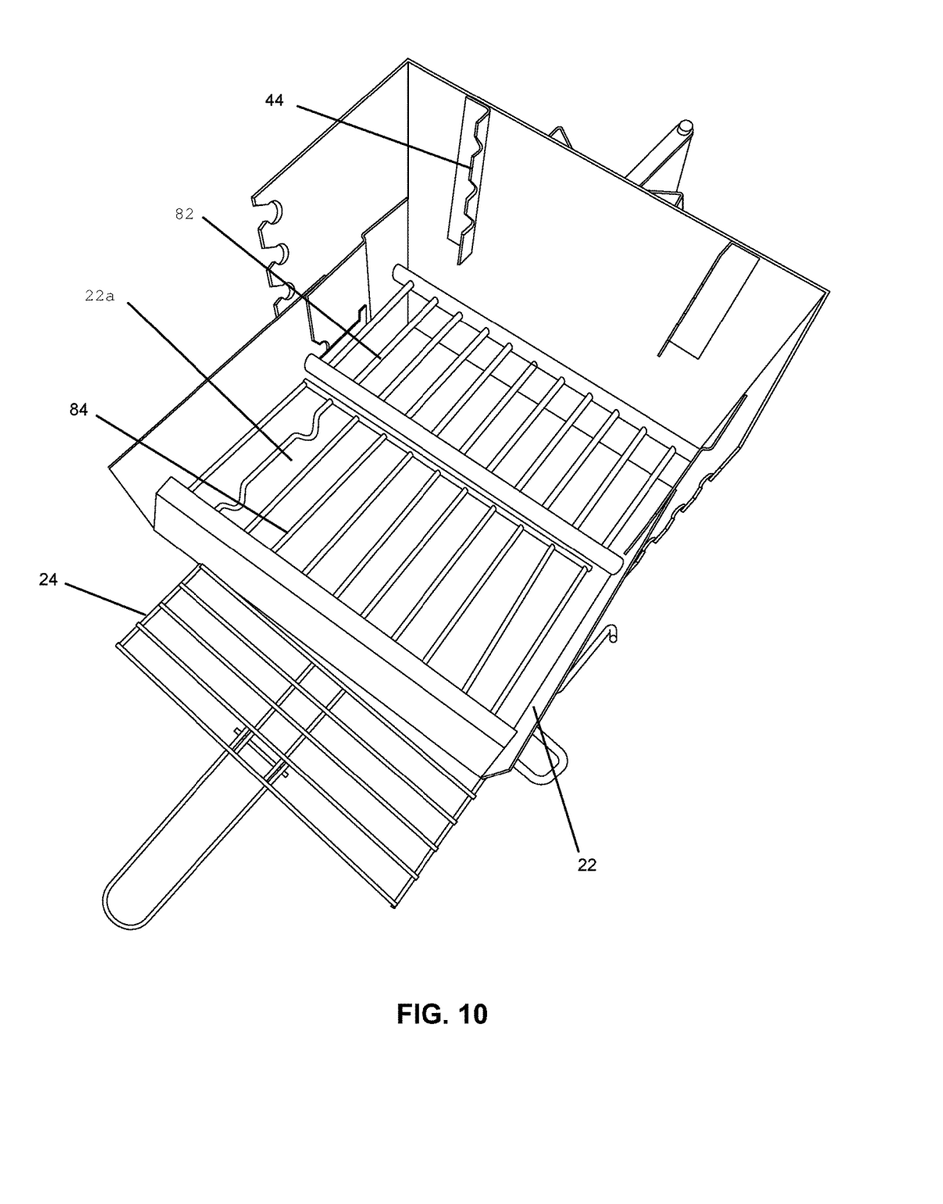
FIG. 10 displays a top isometric view similar to FIG. 9 with an alternate embodiment for support members 44 in accordance with embodiments.

When in use, as seen in FIG. 4, locking handle 32 is released from anchoring members 34 and cooking grid 24 rests using cooking grid mounting assembly 40 found inside the upper chamber 27 of housing 20. As best seen in FIGS. 6 and 10, cooking grid mounting assembly 40 includes receiving members 42 and support members 44 that cooperate with each other to allow grid 24 to be securely supported over the heating element. FIGS. 6 and 10 show different embodiments for support members 44. Support members are centrally disposed on the inner surface of at least one of upright sidewalls 23 or spaced apart a predetermined distance. The front or distal end of cooking grid 24 can be made of a width greater than its rear end that is inserted into upper chamber 27. This wider end comes in abutting engagement with receiving members 42 to help support cooking grid 24 when the rear end is simultaneously supported by support members 44 keeping cooking grid 24 parallel to front retractable wall 22 when in the lowered positions as shown in FIG. 4. When front retractable wall 22 is lowered it is substantially perpendicular to the upright sidewalls 23 and substantially parallel to floor 26, which holds the kindling material. The design of the grill is one that allows the "stack" to be as high as possible to promote faster heating while at the same time maintaining a design that is practical and easy to transport and store.

Figure 7:
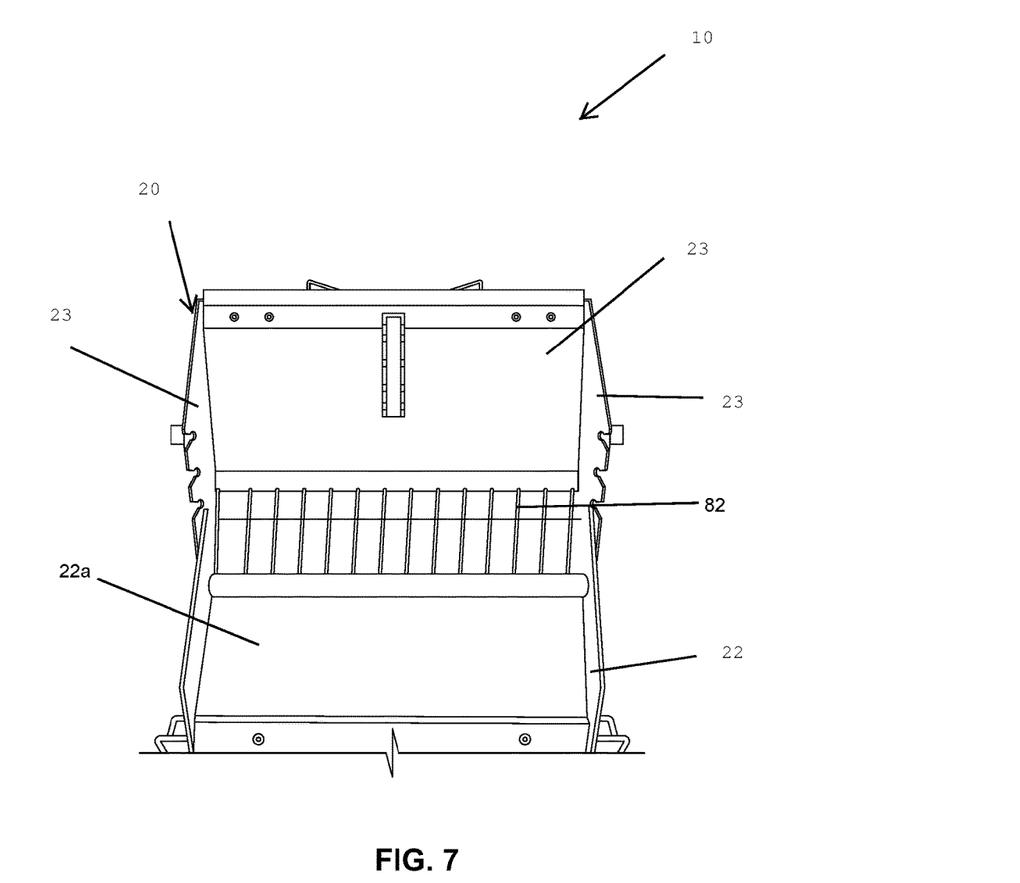
FIG. 7 displays a top view of the present invention with rock grate 80 shown in accordance with embodiments.
Figure 8:
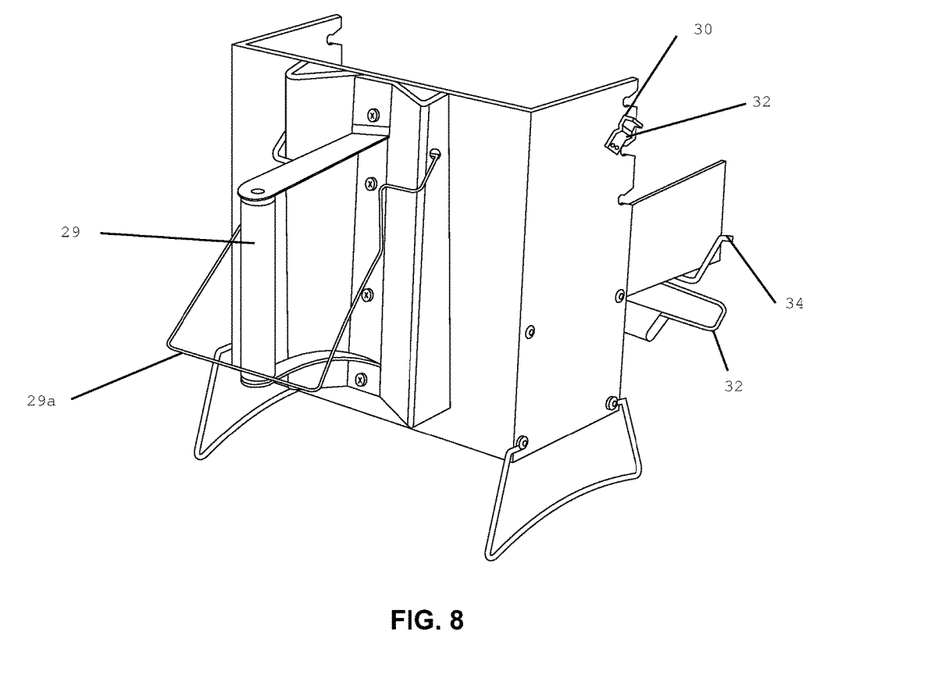
FIG. 8 displays a rear isometric view of a charcoal grill showing handle 29 and alternate hanging/carrying member 29a in accordance with embodiments.
Figure 9:
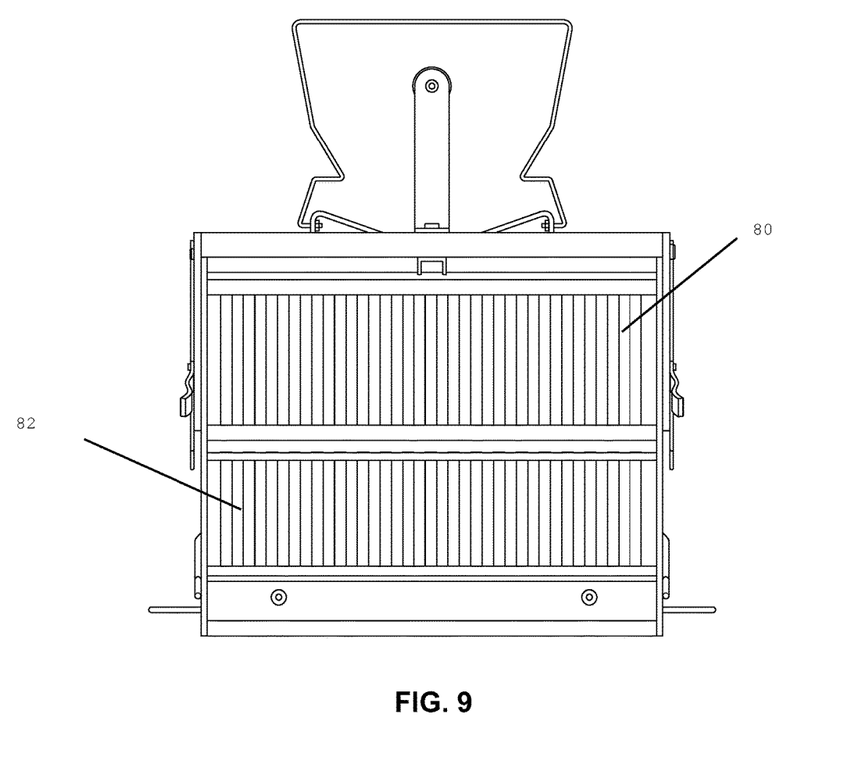
FIG. 9 displays a top view of the present invention with front retractable wall 22 lowered and first and second rock grates 82; 84 shown in accordance with embodiments.

As shown in FIGS. 7 and 10, rock grate assembly 80 can include first rock grate 82 separating the lower chamber of housing 20 from upper housing 27. Rock grate assembly 80 can also include second rock grate 84 positioned over front retractable wall inner surface 22a. Rock grate assembly 80 is configured to hold charcoal or similar materials. In a preferred embodiment, the inside surface 22a of front retractable wall 22 includes second rock grate 84 that expands the cooking surface when front retractable wall 22 is lowered. When the grill is in its operating position, front retractable wall 22 is first in the raised position and locked using locking assembly 30. Charcoal is placed over first rock grate 82 and kindling material is inserted through opening 25. The chimney effect then takes place to quickly light the charcoal on first rock grate 82. Once the charcoal is lit, front retractable wall 22 is lowered, upright sidewalls 23 remain upright, charcoal is now spread from first rock grate 82 to second rock grate 84 and/or new charcoal is placed over second rock grate 84. Cooking grid 24 is then positioning into upper chamber 27 using cooking grid mounting assembly 40. Cooking grid 24 extends over both rock grates to maximize the amount of the cooking surface that is exposed to the charcoal, or similar heating elements.

As shown in FIG. 6, front retractable wall 22 can include side flanges 22b; 22c that cooperate to hold the heating elements within front retractable wall 22. Optionally, a front distal flange 22d can be used to further hold the heating elements within inner surface 22a. A hinged bottom door may be hingedly attached to cover opening 25. This may allow for an individual to pull the hinged bottom door outward and inward so that the lower chamber may be exposed and closed, respectively. In embodiments, the lower chamber may be water-tight and may be able to hold water when water is utilized to extinguish charcoals. When lit, the flammable materials may provide fire and heat. "Chimney configuration" may refer to the fact that the grill may be utilized as a chimney starter in a preferred embodiment.

While this disclosure has been particularly shown and described with reference to preferred embodiments thereof and to the accompanying drawings, it will be understood by those skilled in the art that various changes in form and details may be made therein without departing from the spirit of this disclosure. Therefore, the scope of the disclosure is defined not by the detailed description but by the appended claims.

What is claimed is:

1. A grill, comprising:
   a. a housing assembly having an upper and lower chamber, at least one retractable wall having an inner surface, at least one vertical side wall, and a floor thereby defining a box-like housing;
   b. an opening between said at least one retractable wall and said floor to allow kindling material to enter said housing;
   c. a cooking grid;
   d. a rock grate assembly to hold heating material including a first and second rock grate, said first rock grate positioned within said housing and separating said upper and lower chamber; and
   e. said cooking grid extends at least partially over said first and second rock grates.

2. The grill of claim 1 wherein said housing includes an outwardly extending lip.

3. The grill of claim 1 wherein said front retractable wall includes at least one flange to hold in the heating materials within said inner surface.

4. The grill of claim 1 wherein said housing includes a locking assembly further including a locking handle and at least one anchoring member that cooperate to lock said front retractable wall in a raised position.

5. The grill of claim 1 wherein said cooking grid includes a proximal end and a wider distal end, said cooking grid mounting assembly includes at least one receiving member that receives and supports said wider distal end and at least one supporting member that receives and supports said proximal end.

6. The grill of claim 5 wherein at least one receiving member is cut out into said at least one vertical side wall.

7. The grill of claim 1 including a handle to transport said grill.

8. The grill of claim 1 including legs to support said grill to a bottom surface.

9. The grill of claim 1 wherein said housing is configured to produce a chimney or stack effect when said front retractable wall is in a raised position.

10. The grill of claim 1 wherein said front retractable wall is lockable in its raised position.

11. The grill of claim 1 wherein said housing includes an upper and lower chamber separated by a first rock grate.

12. The grill of claim 1 wherein said housing is defined by two side walls parallel to each other and perpendicularly mounted to a rear wall, a front wall configured to be retractable and capable of pivoting between a lowered and raised position, said first rock grate separating an upper and lower chamber, said second rock grate located flush behind said front wall, said first and second rock grate in a substantially 180-degree relationship with respect to each other when in a lowered position.

13. The grill of claim 1 wherein said retractable wall includes an exterior surface opposite said interior surface, said exterior surface includes a handle, said at least one upright side wall includes anchoring members, said handle being a locking handle adapted to engage said anchoring members, thereby locking said retractable wall in an upright position.

14. The grill of claim 1 wherein said bottom chamber includes an outwardly extending lip, said retractable wall includes a handle mounted to its exterior surface, said cooking grid capable of being inserted in a space between said handle and said exterior surface and rests on said lip, thereby locking said cooking grid in place for easy storage and transportation.

15. A grill, comprising:
a. a housing assembly having at least one retractable wall, at least one vertical side wall, and a floor thereby defining a box-like housing;
b. said at least one vertical side wall having an opening to allow kindling material to enter said housing;
c. a cooking grid;
d. a cooking grid mounting assembly used to mount said cooking grid to said housing;
e. a rock grate assembly to hold heating material including a first and second rock grate, said first rock grate positioned within said housing and separating said upper and lower chamber; and
f. said cooking grid extends at least partially over said first and second rock grates.

16. The grill of claim 1 wherein said floor is rigidly mounted only to said at least one vertical side wall.

17. The grill of claim 1 wherein said second rock grate is located parallel to said inner surface when said at least one retractable wall is in a lowered position.

18. The grill of claim 1 wherein a cooking grid mounting assembly is used to mount said cooking grid to said housing.

* * * * *